US006943688B2

(12) United States Patent
Chung et al.

(10) Patent No.: US 6,943,688 B2
(45) Date of Patent: Sep. 13, 2005

(54) ANTENNA ARRANGEMENT FOR RFID SMART TAGS

(75) Inventors: Kevin Kwong-Tai Chung, Princeton, NJ (US); Shuiwang Liu, Highland Park, NJ (US)

(73) Assignee: Amerasia International Technology, Inc., Princeton Junction, NJ (US)

( * ) Notice: Subject to any disclaimer, the term of this patent is extended or adjusted under 35 U.S.C. 154(b) by 0 days.

(21) Appl. No.: 10/784,704

(22) Filed: Feb. 23, 2004

(65) Prior Publication Data

US 2004/0164864 A1 Aug. 26, 2004

Related U.S. Application Data

(63) Continuation of application No. 10/246,990, filed on Sep. 19, 2002, now Pat. No. 6,703,935, which is a continuation-in-part of application No. 09/854,722, filed on May 14, 2001, now Pat. No. 6,696,954.
(60) Provisional application No. 60/359,558, filed on Feb. 22, 2002.

(51) Int. Cl.[7] .............................................. G08B 13/14
(52) U.S. Cl. ................... 340/572.7; 340/572.2; 340/551; 343/745; 343/748; 343/893; 343/894; 343/866
(58) Field of Search .......................... 340/572.7, 572.2, 340/551; 343/745, 748, 893, 894, 866

(56) References Cited

U.S. PATENT DOCUMENTS

| 3,832,530 | A | 8/1974 | Reitboeck et al. |
|---|---|---|---|
| 4,135,184 | A | 1/1979 | Pruzick |
| 4,663,625 | A | 5/1987 | Yewen |
| 5,221,831 | A | 6/1993 | Geiszler |
| 5,258,766 | A | 11/1993 | Murdoch |
| 5,327,118 | A | 7/1994 | Drucker et al. |
| 5,842,118 | A | 11/1998 | Wood, Jr. |
| 5,923,251 | A | 7/1999 | Raimbault et al. |
| 5,929,760 | A | 7/1999 | Monahan |
| 5,963,134 | A | 10/1999 | Bowers et al. |
| 5,973,599 | A | 10/1999 | Nicholson et al. |
| 6,034,604 | A | 3/2000 | Kaltner |
| 6,069,564 | A | 5/2000 | Hatano et al. |
| 6,094,173 | A | 7/2000 | Nylander |
| 6,127,928 | A | 10/2000 | Issacman et al. |
| 6,351,215 | B2 | 2/2002 | Rodgers et al. |

FOREIGN PATENT DOCUMENTS

| EP | 0 496 609 A1 | 7/1992 |
|---|---|---|
| GB | 2 077 555 A | 12/1981 |
| WO | WO 00/14694 | 3/2000 |
| WO | WO 01/65712 | 9/2001 |

OTHER PUBLICATIONS

DATATRONIC 2000, "Radio Frequency Identification Equipment and Systems", Aug. 28, 1999, 8 Sheets.
Avante International Technology, Inc., www.Smart–Trakker.com, Printout 2001, 8 Sheets.

*Primary Examiner*—Tai T. Nguyen
(74) *Attorney, Agent, or Firm*—Dann, Dorfman, Herrell & Skillman, P.C.

(57) ABSTRACT

An antenna arrangement comprises at least two antenna loops disposed and overlapping in a plane to define a detection region adjacent thereto in which the antenna loops transmit and/or receive electromagnetic signals and through which a wireless article may pass. The antenna arrangement may be coupled to a processor and/or utilization system for performing a desired function.

25 Claims, 8 Drawing Sheets

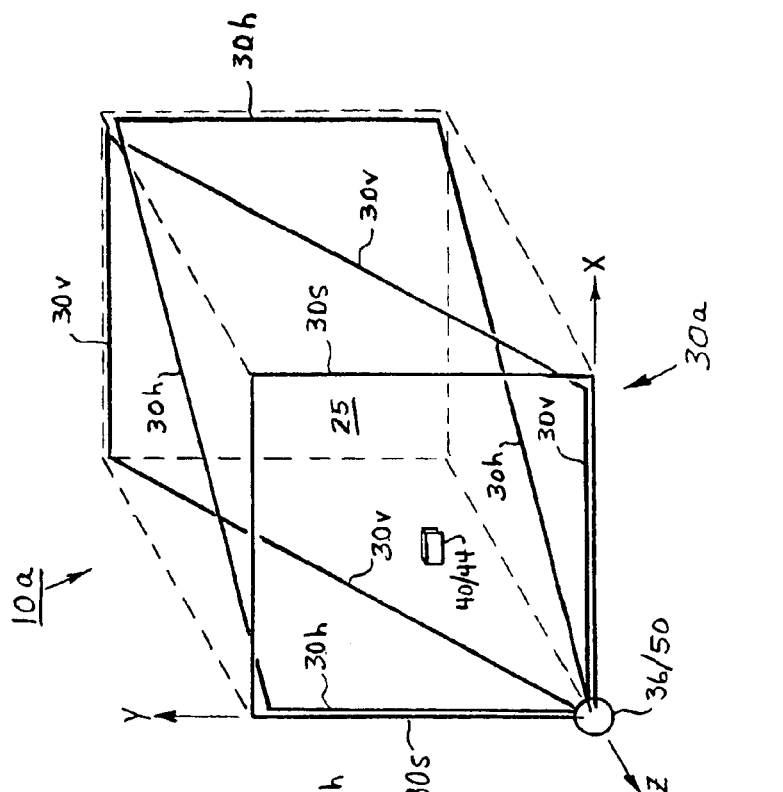
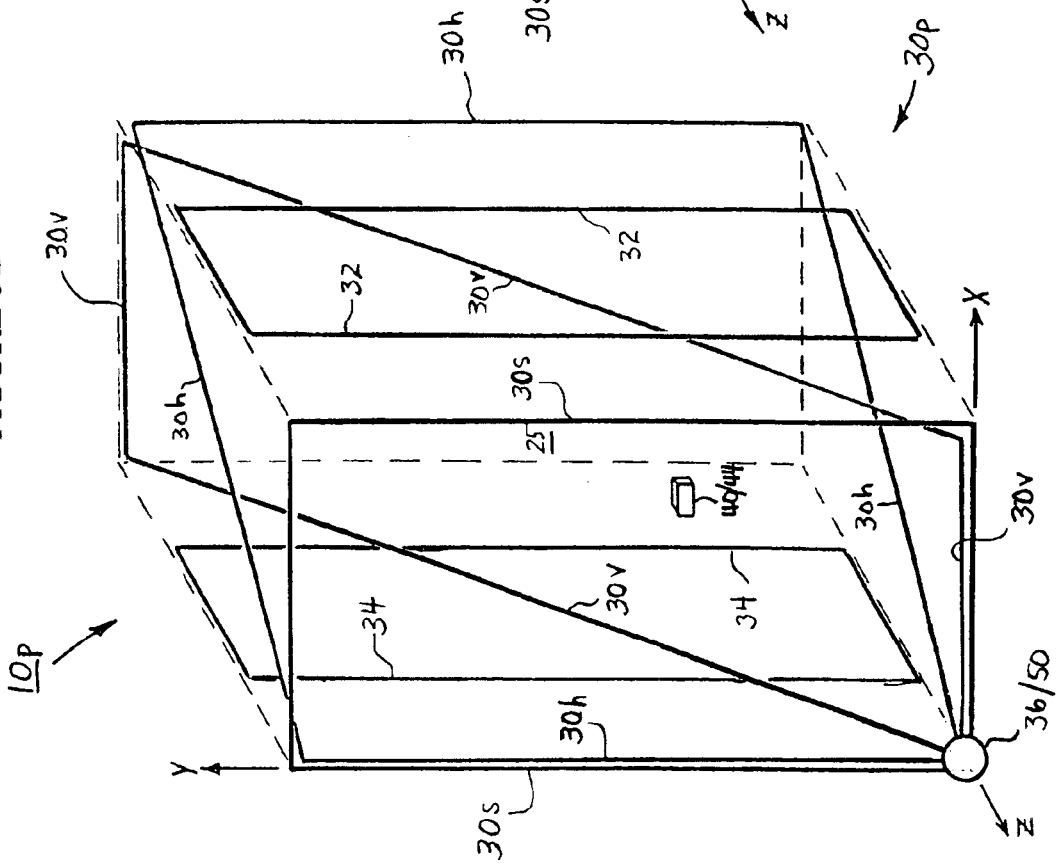

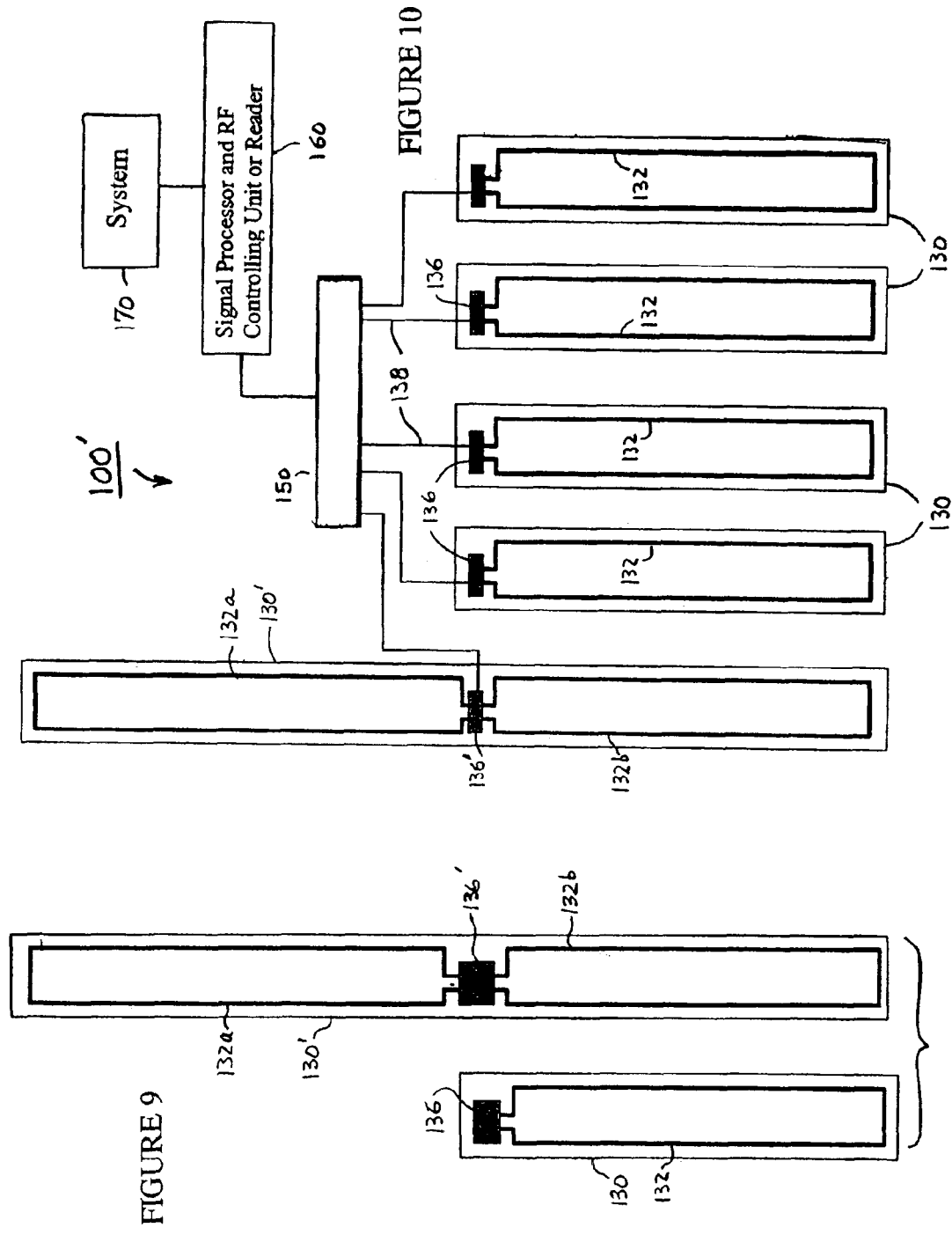

ANTENNA ARRANGEMENT FOR RFID SMART TAGS

This Application is a continuation of U.S. patent application Ser. No. 10/246,990 filed Sep. 19, 2002 now U.S. Pat. No. 6,703,935, which is a continuation in part of U.S. patent application Ser. No. 09/854,722 filed May 14, 2001 (now U.S. Pat. No. 6,696,954 issued Feb. 24, 2004) and which claims the benefit of U.S. Provisional Application No. 60/359,558 filed Feb. 22, 2002.

The present invention relates to an antenna and, in particular, to an antenna arrangement for communicating with a wireless article.

Increasingly, technological means are desired for detecting the presence of people and articles, for identifying people and articles, and for tracking people and articles. Applications of such technology run the gamut, from theft detection devices used in food markets, department stores and other retail establishments, to inventory of products and warehouse stocks, to the control, routing and tracking of baggage at airports, train stations and other travel facilities, and for providing selective access and/or security for personnel and facilities such as hotels, schools, businesses, government facilities and the like, to name but a few.

Conventional prior art systems typically employ a detection portal such as that illustrated in FIG. 1. Portal 2 includes two parallel planar panels 4 each containing a loop antenna coupled to a detector. Panels 4 are supported by base 6. Prior art portal 2 typically is utilized with "tags" that may simply be a small sheet of a metal foil or a simple non-linear electronic device such as a diode coupled to a loop antenna. The presence of such tag in the region between the parallel panels 4 results in a distortion of the radio frequency (RF) signal transmitted by the antennas in panels 4 which is detected and utilized to set off an alarm, such as a buzzer, bell or other audible alarm and/or a light, flashing light or other visible alarm. Thus the system is simply a proximity detector for a tag in the proximity of panels 4.

More sophisticated detection systems might desire to not only detect the presence of a tagged article or person, but also to identify the article or person by identifying the tag. Such systems typically utilize a tag that includes an electronic device coupled to the loop antenna thereof, typically to respond to receipt of RF signals transmitted by the antenna of panels 4 by transmitting an identifying number or code, whereby apparatus to which panels 4 are connected identify the tag.

Conventional antenna arrays utilized in prior art portals typically are not capable of reading 100% of the tags passing in their proximity irrespective of the orientation of the RF tag, i.e. coupling to the antenna of the tag is inadequate at certain tag orientations. While 95% or 98% detection and accuracy may be satisfactory for many applications, it is not satisfactory for more demanding applications such as tracking passenger baggage for air travel, tracking factory and/or warehouse inventory, or identifying persons for security and/or access control.

Accordingly, it would be desirable to have an antenna arrangement that is capable of detecting the presence of a wireless article such as an RF tag within its detection region with high accuracy. It would also be advantageous if such antenna arrangement was capable of operating with wireless articles that include an electronic device (also referred to as an integrated circuit or "IC" or as a chip) including a memory so that information could be written into the memory of the wireless article as well as read from the memory and transmitted by the wireless article.

To this end, the antenna arrangement for detecting a wireless article of the present invention comprises a first antenna loop disposed in a first plane for transmitting and/or receiving electromagnetic signals and a first tunable circuit connected to the first antenna loop for coupling at least received signals therefrom. A second antenna loop is disposed at least in part in the first plane and overlapping at least in part the first antenna loop therein, and a second tunable circuit is connected to the second antenna loop for coupling at least received signals therefrom. The first and second antenna loops overlap and define a detection region adjacent thereto in which the first and second antenna loops transmit and/or receive electromagnetic signals and through which a wireless article may pass. At least received signals from the first and second antenna loops are coupled for detecting a wireless article in the detection region.

BRIEF DESCRIPTION OF THE DRAWING

The detailed description of the preferred embodiments of the present invention will be more easily and better understood when read in conjunction with the FIGURES of the Drawing which include:

FIGS. 5A and 5B are isometric view schematic diagrams of example antenna arrangements having non-orthogonal antennas;

FIG. 9 is a plan view schematic diagram illustrating an example elongated aspect ratio antenna and an example plural antenna;

FIG. 10 is an elevation view schematic diagram of an example detection system employing a detection portal including an example partible curtain antenna arrangement and an example elongated plural antenna;

Figure 1:
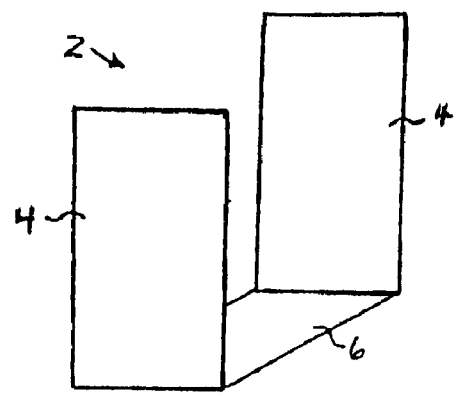
FIG. 1 is an isometric view schematic diagram of a prior art detection portal including an antenna arrangement.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similarly, similar elements or features may be designated by like alphanumeric designations in different figures of the Drawing and with similar nomenclature in the specification, but in the Drawing are preceded by digits unique to the embodiment described. For example, a particular element may be designated as "xx" in one figure, by "1xx" in another figure, by "2xx" in another figure, and so on. It is noted that, according to common practice, the various features of the drawing are not to scale, and the dimensions of the various features are arbitrarily expanded or reduced for clarity.

DESCRIPTION OF THE PREFERRED EMBODIMENTS

Figure 2:
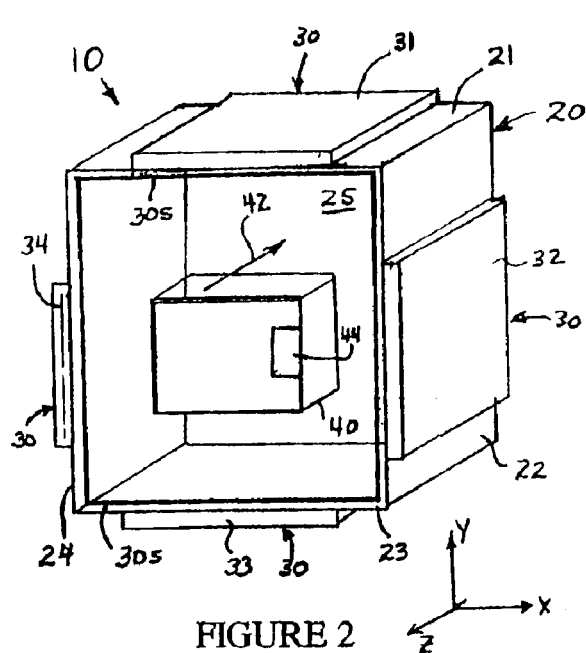
FIGS. 2 and 3 are isometric view schematic diagrams of example detection portals including an antenna arrangement.

FIG. 2 is an isometric view schematic diagram of an example detection portal 10 including an optional physical portal 20 and an antenna arrangement 30. Portal 20 is an example rectangular portal 20 includes four sides, for example, top 21, bottom 23, and sides 22 and 24, defining a passage 25 therethrough. While portal 20 may be square for certain applications, for example, providing a typical about 3-foot by 3-foot (about 0.9 meter by 0.9-meter) square passage through which objects such as baggage is moved by conveyor at an airport, it is generally rectangular for most applications such as doorways and the like, notwithstanding that sides 21–24 may be bowed or arched for aesthetic or other reason or may be provided by a building or other structure that support antenna arrangement 30.

Antenna arrangement 30 includes a plurality of loop antennae 31, 32, 33, and 34 generally disposed in two orthogonal pair of opposing antennae so as to, in use, produce a three-dimensional electromagnetic field within passage 25. Objects 40 to be detected pass through passage 25 in a direction indicated by arrow 42 or are placed therein, and include a wireless article 44 which is also referred to as an RF tag, a smart card or an RFID tag. Antenna arrangement 30 has substantial dimension in the direction of arrow 42, thereby having substantial dimension in all three orthogonal directions (X=width, Y=height, and Z=length), so as to produce a suitable electromagnetic field within passage 25.

As used herein with respect to the invention, "portal" generally refers to a defined space through which objects to be detected pass or may be placed, whereby such objects pass through or are placed within the electromagnetic field pattern of an antenna arrangement, and so is generally the same as a "passage." "Passage" as used herein generally refers to the region or space defined by an antenna arrangement in which it produces an electromagnetic field and/or in which an electromagnetic field produced therein is received by the antenna arrangement. A portal or passage may or may not have specific structure, such as a doorway or corridor, but may be the detection region of the antenna arrangement(s) associated therewith. Portal and passage also include enclosures, storage spaces and the like wherein objects to be detected may reside. The phrase "detection region" may be employed as a generic term to include all of the foregoing as well as any other application location.

As is well known, an antenna (and each antenna in an antenna arrangement) is bilateral in that it will transmit an electromagnetic signal in response to an electrical signal applied to the antenna and in that it will produce an electrical signal in response to an electromagnetic signal received at the antenna. Often such electromagnetic signal is generally referred to as an RF signal, whether or not it is strictly at a frequency within a band of frequencies utilized for RF communication and/or signaling. The electromagnetic field within the portal, passage, door, enclosure, storage area and the like defined by the antenna arrangement is sufficient for at least one of the antennas of the antenna arrangement to communicate with a wireless article such as an RFID tag therein, irrespective of its orientation therein, and detect same.

As used herein with respect to the invention, any of "wireless article," "RFID tag," "RF tag," "tag," "smart card" and the like generally refers to a device including a loop antenna of one or more turns coupled to an electronic device, wherein the electronic device both receives signals via the loop antenna and transmits signals via the loop antenna. The received signals with respect to the wireless article may include signals for controlling and/or operating the electronic device and/or for being stored in a memory associated therewith, whether embodied in the same or a separate electronic chip. The transmitted signals with respect to the wireless article may include information that is stored in the memory of or associated with the electronic device and may include information previously received and stored therein. It is noted that the "received signals" with respect to the wireless article are "transmitted signals" with respect to the antenna arrangement, and that the "transmitted signals" with respect to the wireless article are "received signals" with respect to the antenna arrangement.

Such tag or other wireless article may be part of the object to be detected/identified, or may be made on a rigid or flexible substrate that is placed with and/or attached to such object, such as by adhesive or a strap or tie or the like, or by being packaged therewith, either permanently or releasably, as may be desired for a particular application. Where the object is metallic or otherwise electrically conductive, the wireless article is typically spaced away from the object a sufficient distance, e.g., a few millimeters, to allow operation of its antenna for communication of signals.

Returning to FIG. 2, each of antennae 31–34 is a generally planar loop antenna with one or more turns disposed for maximum area, i.e. of antennae 31 and 33 are spaced apart parallel to the X-Z plane and antennae 32 and 34 are spaced apart parallel to the Y-Z plane, defining passage 25 in which each produces electromagnetic field. Antennae 31–34 may be energized to transmit and/or receive simultaneously, in pairs or in sequence, or may be energized for one transmitting while the other(s) receive, as is advantageous. The direction of the electromagnetic field produced by antenna arrangement 30 is generally perpendicular to the direction 42 of travel of objects 40 to be detected and is most sensitive where tag 44 is oriented parallel to the direction 42 of movement. The antenna circuit of the wireless article is typically tuned for the frequencies of the transmission and detection signals.

Antenna arrangement 30 includes an additional antenna loop 30s disposed at an angle with respect to antenna loops 31–34 to further define the detection region in which antenna loops 31–34 and additional antenna loop 30s transmit and/or receive electromagnetic signals. In particular, additional antenna loop 30s defines a loop through which an object 40 may pass. In other words, the conductor forming loop antenna 30s surrounds passage 25 so that an object 40 and the wireless article 44 associated therewith passing through passage 25 or placed in passage 25 becomes coupled thereto. Additional antenna loop 30s is disposed at an angle of between about 45° and about 135° with respect to loop antennas 31–34 for ensuring that the electromagnetic field patterns thereof include three mutually orthogonal components. Additional antenna loop 30s and processor 50 are coupled for communicating the transmitted and received signals therebetween.

RFID tag 44 on object 40 is generally planar and as illustrated happens to be oriented with the plane of its antenna substantially perpendicular to the direction 42 of its travel, wherein the field of an antenna, e.g., the field induced on such antenna, in the plane thereof tends to be largely in the direction parallel to travel direction 42. Typically, RFID tag 44 is a planar structure in which a planar loop antenna of one or more turns is provided on a suitable substrate, such as a metal foil antenna on a sheet of plastic or other suitable material, and is connected to an electronic device such as an integrated circuit also mounted on the substrate.

Figure 3:
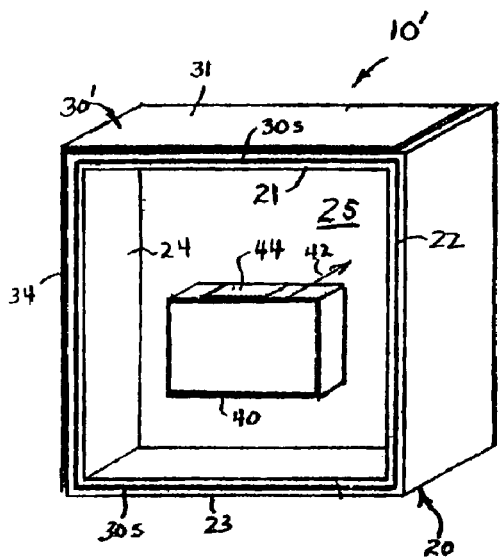

FIG. 3 is an isometric view schematic diagram of an example detection portal 10 including an antenna arrangement 30', or other region, space or enclosure. Antenna arrangement 30' is disposed with antenna 31 on side 21 and antenna 34 on side 24 of portal 20 and wraps around the corner between sides 21 and 24, thereby to define portal 10 and passage 25. RFID tag 44 on object 40 is generally planar and happens to be oriented with the plane of its antenna substantially parallel to the direction 42 of its travel, wherein the field of an antenna in the plane thereof tends to be largely in the direction perpendicular to travel direction 42. Antennas 31, 34 are oriented at an angle between about 45° and 90° with respect to each other, i.e. are skewed or tilted, so as to better couple to RFID tag 44 over a wider range of orientations of tag 44.

Antenna arrangement 30' also includes an additional antenna loop 30s disposed at an angle between about 45° and about 135° with respect to antenna loops 31, 34 to further define the detection region in which antenna loops 31, 34 and antenna loop 30s transmit and/or receive electromagnetic signals including three mutually orthogonal components. In particular, antenna loop 30s surrounds passage 25 so that an object 40 and the wireless article 44 associated therewith passing through passage 25 or placed in passage 25 becomes coupled thereto, as described above. Antenna loop 30s is coupled to processor 50 via filter 36 for communicating the transmitted and received signals therebetween.

Antennae 31, 34 may be sequentially activated, e.g., about 2–20 times per second, or more frequently, if useful, so as to eliminate any interference therebetween. The arrangement of antenna arrangement 30' is suitable where, for example, the width of portal 10 is greater, and may be employed in conjunction with a similar antenna arrangement (not shown) on sides 22, 23.

Figure 4:
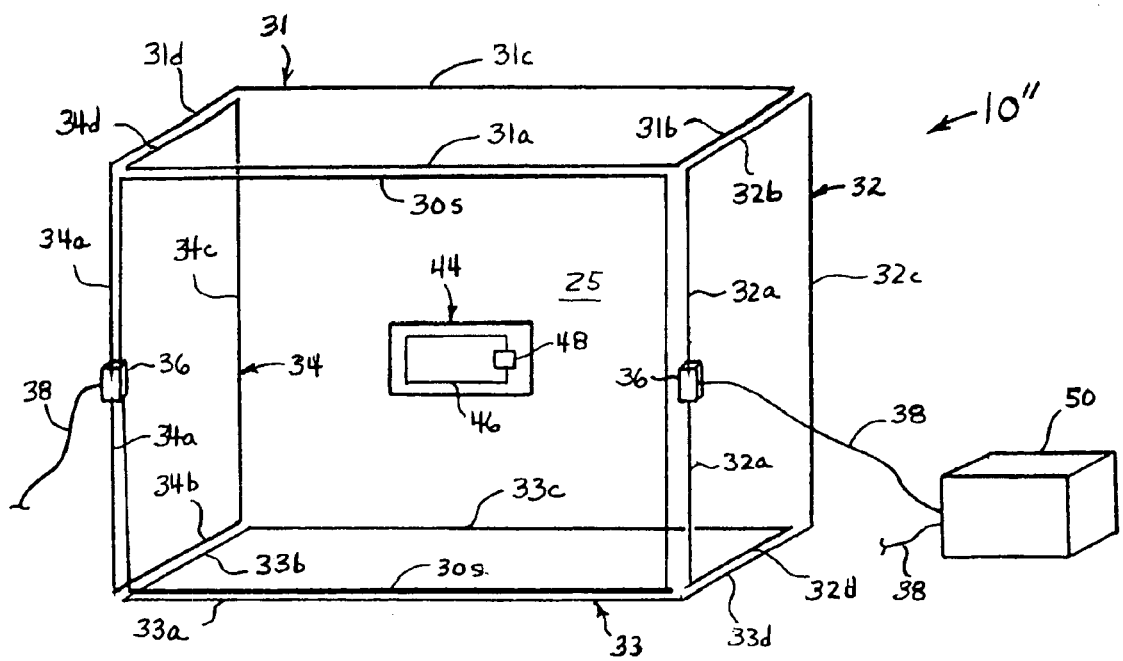
FIG. 4 is an isometric view schematic diagram of an example antenna arrangement.

FIG. 4 is an isometric view schematic diagram of an example antenna arrangement 30" defining a portal 10" having passage 25 therethrough. A first antenna 31, 34 comprises a first loop 31 having conductors 31a, 31b, 31c, 31d defining the periphery of the top of portal 10" and a second loop 34 having conductors 34a, 34b, 34c, 34d defining the periphery of an adjacent side of portal 10". While all of conductors 31a–31d and 34a–34d are connected in series to form one series circuit, conductors 31d and 34d crossover from the entrance to the exit planes of passage 25 so that electromagnetically they form two loops of smaller dimension. The ends of loop 31–34 couple to filter 36 which couples loop 31–34 via coaxial cable 38 to card reader and processor 50 and provides a better signal for decoding, e.g., by matching of electrical characteristics therebetween, if necessary.

In like manner, a second antenna 32, 33 comprises a first loop 33 having conductors 33a, 33b, 33c, 33d defining the periphery of the bottom of portal 10" and a second loop 32 having conductors 32a, 32b, 32c, 32d defining the periphery of an adjacent side of portal 10". While all of conductors 32a–32d and 33a–33d are connected in series to form one series circuit, conductors 32d and 33d crossover from the entrance to the exit planes of passage 25 so that electromagnetically they form two loops of smaller dimension. The ends of loop 32–33 couple to filter 36 which couples loop 32–33 via cable 38 to card reader and processor 50 and provides a better signal for decoding, e.g., by matching of electrical characteristics therebetween, if necessary.

Antenna arrangement 30" also includes an additional antenna loop 30s disposed at an angle between about 45° and about 135° with respect to antenna loops 31–34 to further define the detection region in which antenna loops 31–34 and antenna loop 30s transmit and/or receive electromagnetic signals including three mutually orthogonal components. In particular, antenna loop 30s surrounds passage 25 so that an object 40 and the wireless article 44 associated therewith passing through passage 25 or placed in passage 25 becomes coupled thereto, as described above. Antenna loop 30s is coupled to processor 50 via filter 36 for communicating the transmitted and received signals therebetween.

It is noted that a single loop of a physical conductor is utilized to form each of the two-loops of loop antennas 31–34 and 32–33, and so loops 31–34 are in fact a single loop antenna and loops 32–33 are also a single loop antenna. Because the two loops of either of loop antennas 31–34 or 32–33 are disposed at an angle with respect to each other, each loop provides an electromagnetic field having at least two mutually orthogonal components. Thus, the combination of loop antenna 30s and either of loop antennas 31–34 or 32–33 is sufficient to provide an electromagnetic field having three mutually orthogonal components.

In one example embodiment, each of the conductors 30s, 31a–31d, 32a–32d, 33a–33d and 34a–34d is a braided conductor such as the shield conductor of a coaxial cable or Litz wire. Any suitable conductor of suitably low resistance can be utilized, e.g., with appropriate width, thickness and/or diameter. Cable 38 is preferably a coaxial cable or other suitable electrical conductor. Cable 38 couples RF signals from processor 50 to antennas 31–34 to be transmitted to RFID tags 44, if any, proximate portal 10" and also couples RF signals transmitted by RFID tags 44, if any, proximate portal 10" and received by antennas 31–34 to processor 50.

The distance at which detection of a wireless article occurs is related to the strength of the electromagnetic field induced at the article by the antenna arrangement. Thus, a generally higher power level increases the detection distance. For example, increasing the power from 5 watts to 25 watts can increase the detection distance from about ⅓ meter (about 1 foot) to about 1 meter (about 3 feet).

Processor 50 includes, for example, a conventional RF card reader/writer, such as those available commercially from many manufacturers, such as Datatronic Kodiertechnik GmbH of Germany, Philips Electronics/Infineon of Eindhoven, The Netherlands or Siemens of Munich, Germany. Processor 50 may also include switches and control circuitry therefor for selectively connecting and disconnecting antennas 31–34 and 32–33 sequentially and/or alternately to the card reader/writer of processor 50, thereby to enable a single card reader/writer to be operated with a plurality of antennas.

A typical reader includes a receiver and a decoder function for providing information (data) received via an antenna, e.g., a loop antenna, from a wireless tag. Such reader may also include a write function for writing information via the antenna to the wireless tag 44. Such reader and/or reader/writer typically receives and/or transmits signals at a frequency, e.g., at about 13.56 MHZ, 125 kHz, 915 MHZ or 2.45 GHz. Signals communicated between the reader/writer and the tag interact with the tag for initiating and/or controlling operation of the tag, and/or for transmitting information to the tag (the "writing") or for retrieving information from the tag (the "reading"). Typically, the signal from the reader/writer activates and controls the tag which returns a signal in response thereto, such returned signal including, for example, an identifying number or other identifier, or other useful information or data.

Typically, the distance at which a wireless tag may be read by the reader of processor 50 (the "read/write distance") increases with the power of its transmitted signal, which may be in a typical power level range of about 1–100 watts. The read/write distance also increases with the size of the antenna of the wireless tag and the particular electronic device therein. Plural antennas utilized with a reader increase the read/write distance. For example, if two antennas each hating a read/write distance of 20 inches (about 0.5 m) are disposed at opposite sides of a portal or gate, as illustrated, for example, in FIGS. 2 and 4, the portal or gate may be up to about 40 inches (about 1 m) wide. Similarly, the usable height of the portal or gate is increased where two antenna are disposed at the top and bottom thereof, also as illustrated, for example, in FIGS. 2 and 4. Such plural antennas may be utilized with a single reader/writer or with plural readers/writers, as convenient.

A wireless article 44 includes a loop antenna 46 and an electronic device 48 including a memory whereby electromagnetic signals received by loop antenna 46 are provided to electronic device 48 and signals produced by electronic device 48 are transmitted via loop antenna 46. Processor 50 processes transmitted signals of a type adapted to be received by electronic device 48 via loop antenna 46 and processes received signals of a type adapted to be produced by electronic device 48. Suitable RFID tags or cards 44 are available from many sources.

A preferred card available from Avante International Technology, Inc. located in Princeton Junction, N.J., utilizes the I-Code chip electronic device available from Philips Electronics located in Eindhoven, The Netherlands. Suitable integrated circuits for such cards also include the"Tag-It" devices available from Texas Instruments of Texas, United States, and the "Pico-Tag" available from Inside Technology of France, as well as similar devices available from Microchip company of Phoenix, Ariz. Each of the foregoing operate at a frequency of about 13.56 MHZ which is preferred because it does not present a microwave hazard to personnel and allows communication between the RFID tag and the antenna at a suitable distance. Tags and devices at other frequencies, such as those operating at about 915 MHZ available from Intermec company of Washington, and those operating at about 2.45 GHz available from Single Chip Systems of San Diego, Calif. Preferably, the electronic device is of the type that operates without a battery, as do many of those referred to above.

FIGS. 5A and 5B are isometric view schematic diagrams of example antenna arrangements 30a, 30p including non-orthogonal antennas. Antenna arrangement 30a of FIG. 5A may be utilized, for example, with respect to relatively larger passages such as those for personnel or vehicles, and antenna arrangement 30p of FIG. 5A may be utilized, for example, with respect to relatively smaller passages 25 such as those for identifying and/or tracking objects such as baggage or packages.

Portal 10a of FIG. 5A is defined by an antenna arrangement 30a which includes three loop antennas 30s, 30h, 30v disposed in relation to each other to define passage 25 through which or into which an object associated with a wireless article or RFID tag 44 may pass (e.g., in the ±Z direction) or be placed. Antenna arrangement 30a includes loop antenna 30s in the X-Y plane surrounding passage 25, for example, near one of an entrance or exit thereof. Loop antenna 30v is skewed or diagonally positioned at an angle of up to about 45° with respect to the X-Y plane (i.e. is rotated about the X axis) and loop antenna 30h is skewed or diagonally positioned at an angle of up to about 45° with respect to the X-Y plane (i.e. is rotated about the Y axis). Thus, each of loop antennas 30s, 30v, 30h is skewed with respect to the others thereof and at least two are skewed with respect to the normal travel direction of an object in passage 25.

For a typical baggage or package passage having a passage opening of about 0.9 m by 0.9 m (about 3 feet by 3 feet), and a passage length or depth of about 0.9 m (about 3 feet), satisfactory detection of RFID tags is provided with a transmitted carrier signal power level in the range of about 20–30 watts.

Antenna arrangement 30a is also suitable for smaller passages and for larger passages, and the operating power level is appropriately adjusted. For example, for a typical larger passage, such as one suitable for the size of a typical shipping container, having a passage opening of about 3 m by 3 m (about 10 feet by 10 feet), and a passage length of about 3 m (about 10 feet), satisfactory detection of RFID tags is provided with a transmitted carrier signal power level in the range of about 30–60 watts.

Portal 10p of FIG. 5B is defined by antenna arrangement 30p which includes six loop antennas 30s, 30v, 30h, 30t, 32, 34 disposed in relation to each other to define passage 25 through which or into which an object 40 associated with a RFID tag 44 may pass (in the ±Z direction) or be placed. Antenna arrangement 30p includes loop antenna 30s in the X-Y plane surrounding passage 25, loop antenna 30t in the X-Z plane at one of the top and bottom of passage 25, and a pair of opposing loop antennas 32, 34 in the Y-Z plane at opposing sides of passage 25. In addition, loop antenna 30v is skewed or diagonally positioned at an angles up to about 45° with respect to the X-Y plane (i.e. is rotated about the X axis) and loop antenna 30h is skewed or diagonally positioned at an angle up to about 45° with respect to the X-Y plane (i.e. is rotated about the Y axis).

Thus, noting that loop antennas 30s, 30t, 32, 34 are either perpendicular to each other or parallel, each of loop antennas 30v, 30h is skewed with respect to each of the other loop antennas 30s, 30t, 32, 34 and at least two loop antennas 30v, 30h are skewed with respect to the normal travel direction of an object in passage 25.

Antenna arrangement 30p is suitable for passages of various sizes, and the operating power level is appropriately adjusted. For example, a typical personnel doorway, access, egress or portal that is compliant with the United States Americans with Disabilities Act (ADA), which is of sufficient width for easy passage of a wheelchair, has a passage opening of about 1.2 m wide by 2.1 m (about 4 feet by 7 feet), and a passage length of about 0.9 m (about 3 feet). The loops of loop antennas 30s, 30v, 30h, 32 and 34 are typically in the range of about 6–9 m (about 20–30 feet) long, and the side loop antennas 32, 34 read an RFID tag 44 at a distance of about 0.9 m (about 3 feet). Satisfactory detection of RFID tags is provided with a transmitted carrier signal power level in the range of about 30–60 watts provided by the reader/writer.

Antenna arrangements 30*a*, 30*p* of FIGS. 5A and 5B are each operatively coupled to a processor 50 for reading information from an RFID tag 44 and/or for storing information therein, as may be desired. Preferably, such coupling includes a filter 36 and/or a processor/sequential switch 50 operative for selectively activating and/or sequencing antennas 30*s*, 30*v*, 30*h*, 30*t*, 32, 34 in like manner to that described above, for example, in relation to FIGS. 2–4. Filter 36 and/or switch 50 may be located at any convenient position in the loop defined by each of the antennas. The switching rate need be only high enough that the electromagnetic field direction be switched through its various orientations at a rate faster than an object and the RFID tag associated therewith can physically move through the passage. Typically, an activation time in the range of about 0.01–0.5 seconds for each loop antenna is satisfactory for sampling and reading an RFID tag, with a shorter time being employed where the objects move through the passage more quickly.

In an embodiment employing, for example, three antennas the three antennas are alternatingly selectively connected to and operated with a single card reader/writer at the rate of 6 times per second so that out of each 167 millisecond cycle, each antenna is connected for about 55 milliseconds and disconnected for about 112 milliseconds in alternating fashion sequentially with the other antenna. In an embodiment employing, for example, ten antennas and sequenced at a rate of 10 times per second so that for each 100 millisecond cycle, each antenna is connected for about 10 milliseconds and is disconnected for about 90 milliseconds in alternating fashion sequentially with the other antennas.

As a result, each of the loop antennas 30*s*, 30*v*, 30*h*, 30*t*, 32, 34 is disposed at an angle between about 45°–90° with respect to the direction of movement, generally along the ±Z axis, of object 40 so as to reliably communicate with an RFID tag 44 associated therewith irrespective of the orientation of the RFID tag within passage 25. Such communication in a properly arranged embodiment is capable of almost 100% reading accuracy, if not actual 100% accuracy.

Such antenna array arrangements as antenna arrays 30*a*, 30*p* are also suitable for being disposed in storage bays, storage containers, closets, file rooms, shipping containers and other containers or enclosures which, when coupled to a processor 50, can identify and/or inventory the articles and objects in such bay or container or enclosure. Thus, an identification, inventory and/or tracking system is provided that is operative without unpacking or otherwise requiring access to or removing the articles and objects from the container or enclosure in which they are located.

Figure 6:
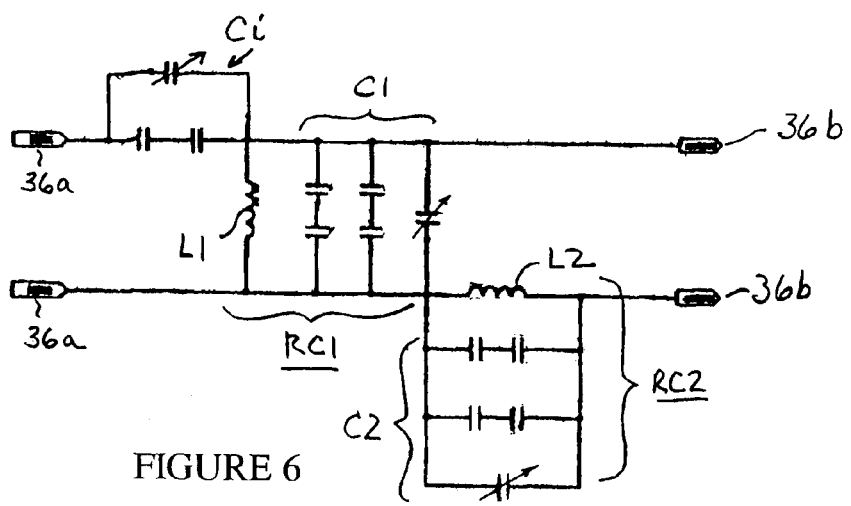
FIG. 6 is a schematic diagram of an example filter for use with the antenna arrangements described herein.

FIG. 6 is a schematic diagram of an example filter 36 for use with the antenna arrangements described herein. Filter 30 includes a pair of input terminals 36*a* and a pair of output terminals 36*b*. Capacitor Ci in series with one of input terminals 36*a* is a capacitance network typically including two series-connected fixed-value capacitors in parallel with a variable capacitor for adjusting the filter characteristics of filter 36. Filter 36 also includes resonant circuit RC1 coupled in parallel with the signal path between input and output terminals 36*a*, 36*b*, and resonant circuit RC2 coupled in series with the signal path at an output terminal 36*b*. Capacitor Ci and resonant circuits RC1, RC2 are tuned to resonate substantially at the carrier frequency, e.g., 13.56 MHZ, to provide the best detector response.

Resonant circuit RC1 includes a parallel resonant circuit including an inductor L1 and a capacitor C1 in parallel. Capacitor C1 is a capacitance network typically including two sets of two series-connected fixed-value capacitors in parallel and in parallel with a variable capacitor for adjusting the resonance characteristics of resonant circuit RC1. Typically, resonant circuit RC1 is tuned to a frequency to provide best detection response with respect to the carrier frequencies at which a reader/writer of processor 50 and a wireless article 44 communicate.

Resonant circuit RC2 includes a parallel resonant circuit including an inductor L2 and a capacitor C2 in parallel. Capacitor C2 is a capacitance network typically including two sets of two series-connected fixed-value capacitors in parallel and in parallel with a variable capacitor for adjusting the resonance characteristics of resonant circuit RC2. Typically, resonant circuit RC2 is tuned to a frequency to provide best detection response with respect to the carrier frequencies at which a reader/writer of processor 50 and a wireless article 44 communicate.

In combination, capacitor Ci and resonant circuits RC1, RC2 enhance the coupling of desired signals from processor 50 via antenna arrangement 30 to an RFID tag 44 disposed within the electromagnetic field pattern of antenna arrangement 30 and from an RFID tag 44 so disposed to processor 50 via antenna arrangement 30, and impede the coupling of undesired signals, such as signals at harmonics of the desired signals or at other frequencies.

Figure 7:
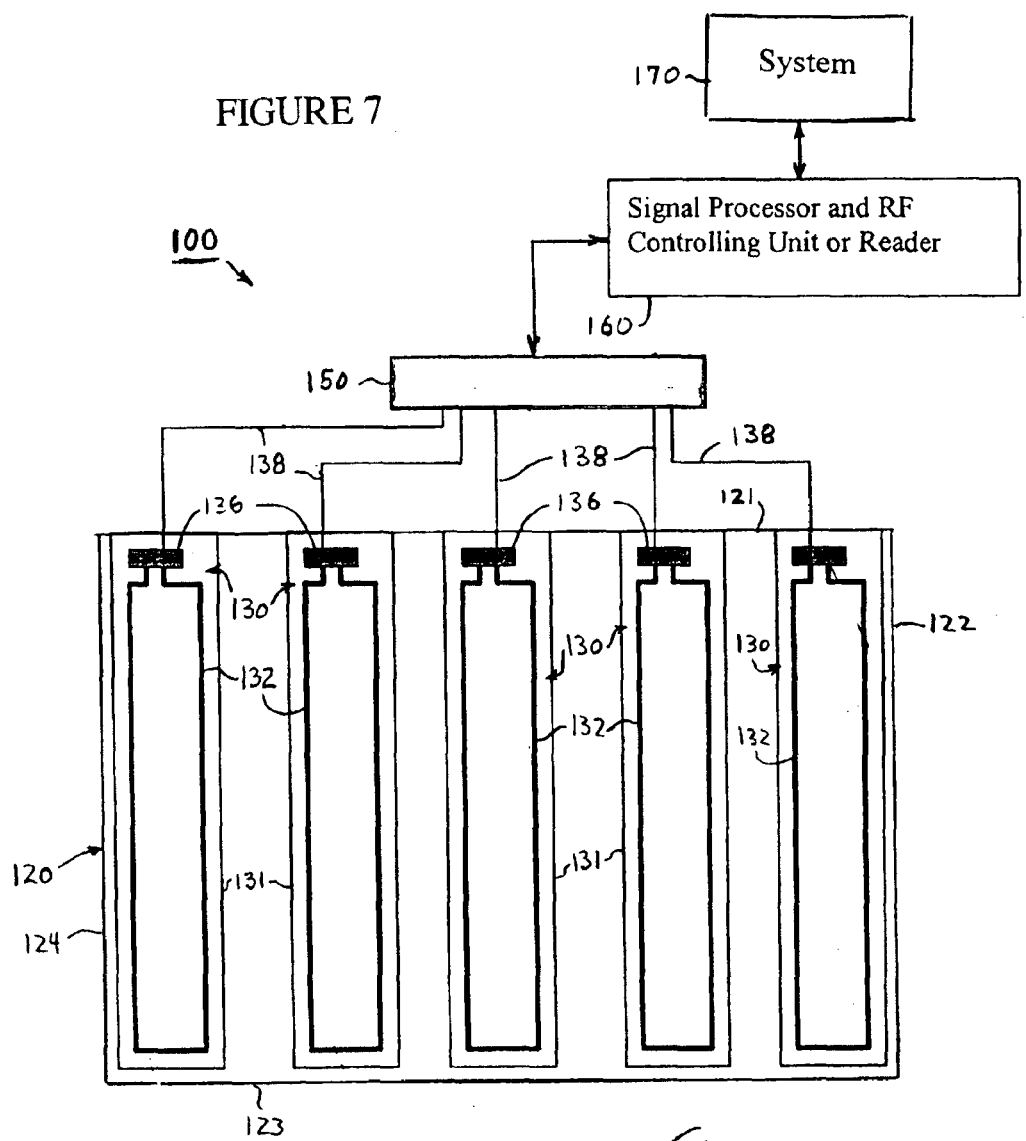
FIG. 7 is an elevation view schematic diagram of an example detection system having a detection portal including an example partible curtain antenna arrangement.

FIG. 7 is an elevation view schematic diagram of an example detection system 100 having a detection portal 120 including an example partible "curtain-type" antenna arrangement. The curtain-type antenna arrangement includes a plurality of hanging flexible antennas 130 that hang from the top 121 of portal 120 (doorway 120) in similar manner to the flexible plastic panels or strips of a conventional hanging flexible doorway as is used in warehouses and the like where it is desired to easily pass through a doorway without having to open and close a large door, such as a swinging door or an overhead door, and yet provide some degree of closure to keep out the weather and the like.

Typically, each panel or strip 131 is made of a tough, flexible plastic such as polyvinyl chloride (PVC) or other suitable plastic substrate and is of a length to reach or almost reach the bottom 123 of the doorway/portal 120. The panels 131 at the left and right extremes are preferably proximate the sides 122, 124 of doorway/portal 120, and, over the width of doorway/portal 120, intermediate adjacent panels 131 are hung substantially edge-to-edge from the top of the passageway 120 so as to touch or slightly overlap or be close to one another. As a result, the plurality of flexible substrates 131 substantially cover passageway 120, and antenna loops 132 are disposed on a sufficient number of the flexible substrates 131 so as to transmit and/or receive electromagnetic signals to a wireless article 44 proximate passageway 120.

An array of antennas 130 is formed by antenna loops 132 on the flexible panels 131 of the partible curtain-type doorway, e.g., a personnel or vehicle entrance to a building or other facility. Each antenna loop 132 is formed of a metal conductor, such as a strip of copper or aluminum conductor, attached to panel 131, such as by an adhesive or by heat bonding, and may be laminated between two sheets of the substrate 131 material that are laminated together either adhesively or by heat to enclose antenna loop 132 therebetween. The conductor of antenna loop 132 typically extends along a substantial part of the length of panel 131 and the sides of antenna loop 132 are separated by a substantial part of the width of panel 131 so as to define a loop of suitable size for operation at the frequency selected for communication between antenna 130 and any wireless articles 44 in proximity thereto.

It is noted that one or more additional antennas and/or antenna arrangements may be employed in conjunction with the arrangement 130 of antenna loops 132, and the additional antennas may be skewed 45° or more with respect to antenna loops 132, so as to provide additional detection assurance for certain orientations of the wireless article, or for providing coverage of additional space, such as an enclosure, storage space or the like. Such may include an additional antenna loop surrounding the doorway or passage 120 in like manner to loop antenna 30s described above or by additional antenna loops 132 suspended in skewed relationship to antenna loops 132 as illustrated. In particular, a surrounding antenna loop surrounds passage 120 so that an object and the wireless article associated therewith passing through passage 120 or placed in passage 120 becomes coupled thereto, as described above.

Such surrounding or skewed loop antenna may be disposed at an angle between about 45° and about 135° with respect to antenna loops 132 to further define the detection region in which antenna loops 132 and such surrounding/skewed antenna loop transmit and/or receive electromagnetic signals including three mutually orthogonal components. Such surrounding and/or skewed antenna loop or loops is or are coupled to processor 160 via filter 136 and switch 150 for communicating the transmitted and received signals therebetween.

The width and thickness of the metal conductor of antenna loop 132 is selected for suitable resistance and conductivity for proper operation. Thus, the shape of antenna loop 132 tends to follow or be proximate the periphery of panel 131 which provides a supporting substrate for antenna 130. Alternatively, conductor 132 may be a deposited strip of an electrically-conductive flexible adhesive such as type TP8090 available from AI Technology, Inc. located in Princeton Junction, N.J.

Each antenna 130 is selectively coupled to a processor 160 via switching circuit 150 in predetermined order and/or sequence and/or combinations. Each antenna 130 is coupled to switching circuit 150 via a filter 136 and a cable 138 for coupling RF signals therebetween for communicating and/or signaling with wireless articles 44 proximate portal 120. Filter 130 provides suitable matching of electrical characteristics for providing a better signal for decoding by the reader/writer of processor 160, which reader/writer receives and decodes signals from tag 44 and/or encodes and transmits signals to tag 44. Processor 160 further controls the operation of switches of switching circuit 150 for selectively coupling ones of antennas 130 to processor 160, for example, in sequence or alternatingly. Cable 138 is a coaxial cable or other suitable conductor for the signals passing between processor 160 and antennas 130.

Processor 160 couples to system 170 which utilizes information (data) produced by the reader/writer of processor 160 in response to wireless tags 44 being in proximity to antenna 130, and may provide information (data) to the reader/writer of processor 160 for initiating or controlling operation of a wireless tag 44 in proximity to antenna 130, or both. System 170 may be any apparatus that may utilize information (data) provided, received and/or exchanged with a wireless tag for any desired purpose, for example, for inventory control, access control, electronic gates, baggage and/or package tracking, vehicle toll collection (e.g., E-Z-PASS, E-PASS and the like), theft prevention, retailing, vehicle monitoring and other applications as desired.

The arrangement of antennas 130 is very effective in coupling to wireless articles (tags) 44 because the objects, such as packages, boxes and the like, to which the tags 44 are affixed part the panels 131 when passing through portal 120, thereby causing the movement of one or more of antennas 130. Because antennas 130 so move relative to tags 44, their orientation with respect to the wireless tag 44, and that of the electromagnetic fields produced thereby, changes and it is almost impossible for the tag 44 to pass through portal 120 without being effectively coupled to one or more of antennas 130, thereby to reliably be detected. In other words, the relative orientations of the antenna patterns of the antennas 130 and of the antennas of tags 44 changes between various orientations ranging from perpendicular or orthogonal to alignment, thereby covering all orientations. Further, because the antennas 130 are sequentially operative due to the action of switching circuit 150, interference and other undesirable interaction between ones of antennas 130 is eliminated, thereby enabling more reliable communication between the reader/writer of processor 160 and the electronic device of tag 44.

It is noted that panels 131 between those of panels 131 having an antenna loop 132 are not shown in FIG. 6 which approximates an arrangement where every other one of panels 131 has an antenna loop 132. Alternatively, every panel 131 may have an antenna loop or less than every other panel 131 may have an antenna loop 132 as may be appropriate in a given portal 120 for satisfactory operation.

Figure 8:
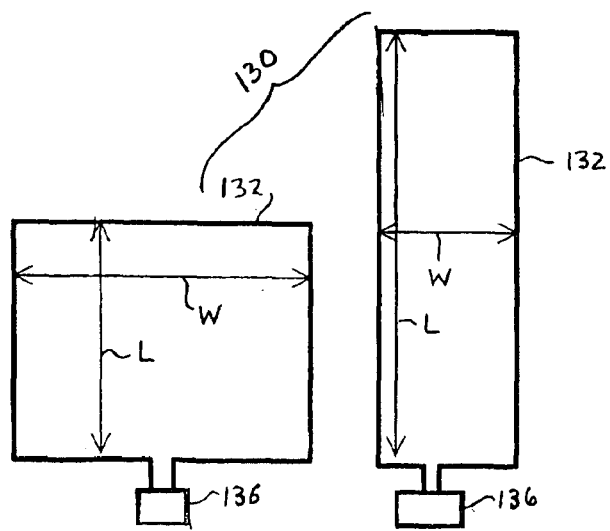
FIG. 8 is a plan view schematic diagram illustrating antennas of different aspect ratios.

FIG. 8 is a plan view schematic diagram illustrating antennas 130 of different aspect ratios. Specifically, loop conductor 132 defines a substantially planar loop having a width W and a length L measured from a side including filter 136. Typically filter 136 connects to loop 132 at a position along one of the sides thereof, most typically toward the center of such side. For a given overall length L, the basic efficiency of the antenna as indicated by the distance perpendicularly away from the plane of loop 132 at which a tag 44 can be read and written to (the "read/write distance") is substantially the same. For example, an antenna loop 132 having a length of four feet (about 1.2 m) and a resistance of 0.5 ohm when formed to define a square portal having a width and a length of one foot (about 0.3 meter), and when operated with a reader/writer having a power in the range of about 2.5–5 watts, reads a typical I-Code card at a distance of about 2 feet (about 0.6 meter).

For an antenna loop 132 having a width of about 6–9 inches (about 0.15–0.23 meter), when the length L is doubled to 8 feet (about 2.4 m), tripled to 12 feet (about 3.6 m) and quadrupled to 16 feet (about 4.8 m), the read/write distance is less than 12 inches (about 0.3 m), 6 inches (about 0.15 m) and 2 inches (about 0.05 m), respectively. The resistance of antenna loop 132 should be kept low, e.g., less than one ohm, to avoid decrease in the read/write distance, and a flat or ribbon conductor is preferred.

Typically, to increase the read/write distance, the overall length of the antenna may be increased along with the power level. For example, a power level of about 30 watts can provide a read/write distance of over 1.5 meters (over 4½ feet).

FIG. 9 is a plan view schematic diagram illustrating an example elongated aspect ratio antenna 130 and an example plural antenna 130'. Elongated aspect ratio antenna 130 is, for example, as described above in relation to FIG. 6.

Elongated aspect ratio antenna 130' is, for example, twice as long as is antenna 130, and comprises two antenna loops 132a and 132b connected in parallel by filter 136' for coupling to cable 138. Antenna 130' may be operated at the same or at a lower power level than antenna 130, and yet provide the same or an increased read/write distance perpendicular to the plane of antenna loops 132a, 132b.

Two or more antenna loops 132 may be connected in parallel via filter 136' such as two or four loops 132 to provide an antenna of double or quadruple the length of antenna 130, or are otherwise arranged to extend or shape the read/write region thereof. It is noted that such parallel-coupled antennae are properly interconnected by filter 136' the electrical characteristics of which are tailored to the particular number and characteristics of the respective antenna loops 132, 132a, 132b, and so the plural antennae do not need to be switched as described above, e.g., in relation to FIG. 4, but may be, if desired.

FIG. 10 is an elevation view schematic diagram of an example detection system 100 employing a detection portal including an example partible curtain antenna array 130 as illustrated in FIG. 6 and an example elongated plural antenna 130' as illustrated in FIG. 8. In all respects, the embodiment of FIG. 9 is arranged and operates in like manner to system 100 and antenna 130, 130' as described above. System 100 may include plural antenna 130 in a portal, or plural antennas 130' in a portal, or a plurality of portals of either or both antenna types, as may be necessary and/or convenient with respect to a particular application for system 100. Moreover, the portal thereof need not be a conventional portal such as a doorway, but may be defined by the arrangement of antennas 130, 130' disposed by hanging or other attachment to physical structure at the utilization location.

Figure 11A:
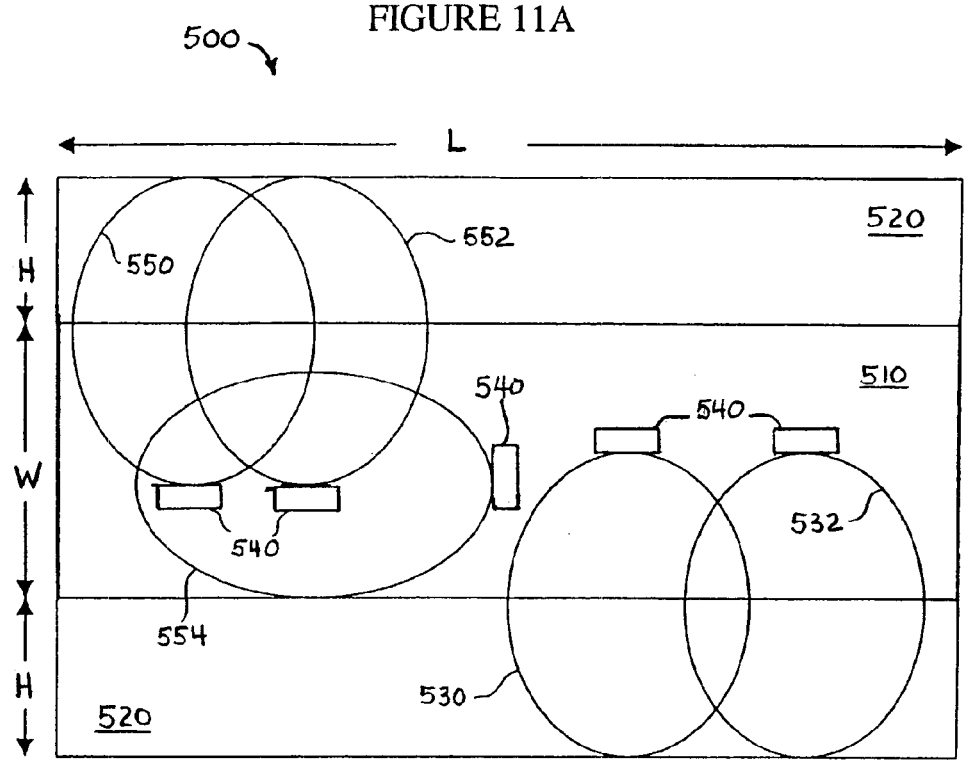
FIGS. 11A and 11B are an unfolded view and an isometric view, respectively, of an example open antenna array arrangement.
Figure 11B:
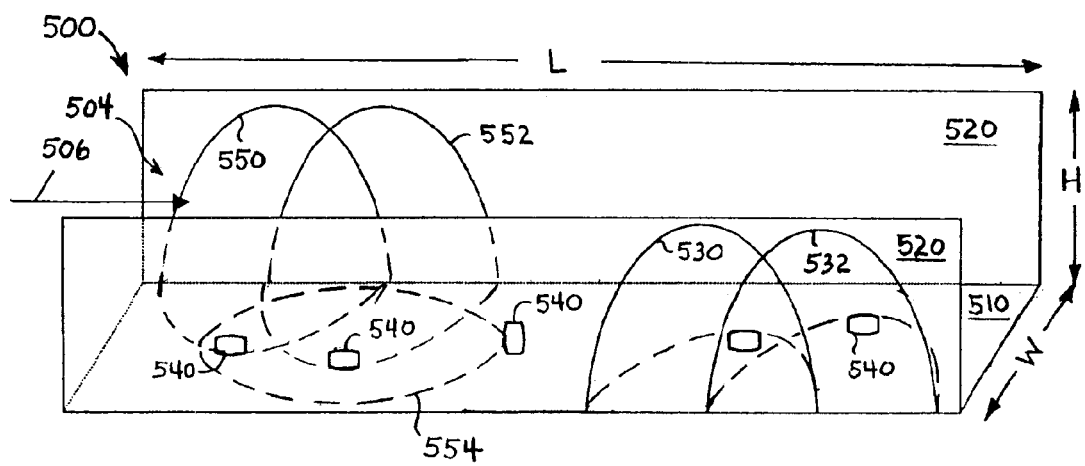

FIGS. 11A and 11B are an unfolded view and an isometric view, respectively, of an open or trough antenna array arrangement 500. Open antenna arrangement 500 includes three panels, e.g., a bottom or center panel 510 and two spaced apart side panels 520 contiguous thereto, wherein the two side panels 520 are typically positioned perpendicular to center panel 510, but may be at a greater or lesser angle, if convenient or desired. For example, the angle between adjacent panels may be between about 80° and about 100°. FIG. 11A is an "unfolded" view in that panels 520 are illustrated in a plane with center panel 510, rather than perpendicular thereto as in the position in which they are utilized. The designations "bottom" and "side" are examples in that antenna arrangement 500 may be utilized in any desired orientation. For example, the side called "bottom" may be positioned at the top or a side depending upon the need and/or convenience in a particular application or environment, e.g., so as to allow a "tall" or "wide" object to pass without hindrance.

Panels or planes 510, 520 define an open passage or trough 504, i.e. a detection region, through which articles may pass (e.g., in the direction indicated by arrow 506) or in which articles and/or objects may be placed for detecting wireless tags (smart RFID tags) thereon, as described above. The passage 504 is described as "open" because it is not enclosed on four sides, as is the case, for example, for antenna arrays 10, 10', 10", 10a and 10p of FIGS. 2, 3, 4, 5A and 5B. An open passage or trough is convenient and may be desirable because it facilitates its installation, e.g., in locations with pre-existing conveyors, allows for passage of an article having a height greater than the height of the passage, and makes manual retrieval of any article therein easier and safer.

For example, antenna arrangement 500 may be installed in or removed from an operation position in which a conveyor moves articles having wireless tags through passage or trough 504 thereof without having to remove the conveyor, as is the case with a closed or "tunnel" type of antenna arrangement wherein the conveyor must traverse an enclosed passage. Installation and removal of antenna arrangement 500 may be further facilitated where panels 520 are either hinged to panel 510 and/or are detachable therefrom, and such arrangement also eases transport.

Typically, antenna arrangement 500 is disposed with center panel 510 at bottom with a conveyor passing through passage 504 parallel and proximate to panel 510 and with side panels 520 extending upwardly on either side of the conveyor. For an example baggage conveyor, such as may be utilized at an airport or railroad station, arrangement 500 may have a length L of about 60–80 inches (about 1.5–2 meters), a width W of about 36–43 inches (about 0.9–1.1 meters) and a height H of about 25–30 inches (about 0.63–0.76 meters), thereby to accommodate a 1 meter wide conveyor belt, although other dimensions may be utilized for other applications of arrangement 500.

Example antenna arrangement 500 includes five loop antenna 530, 532, 550, 552, 554, each of which is coupled by a tuning circuit, matching network and/or filter 540 (e.g., similar to tuning network or filter 36 described above) and coaxial cables 542, 544 to a wireless article reader/decoder (e.g., similar to reader/decoder 50, 150, 160 described above). The loops of antenna 530 and 532 extend to proximate the edge of panel 520 and are partially overlapping, e.g., with about 10–40% of the area being overlap, and are disposed on both bottom panel 510 and one of panels 520, e.g., with about 20–70% of the area on one panel. Similarly, the loops of antenna 550 and 552 extend to proximate the edge of other panel 520 and are partially overlapping, e.g., with about 10–40% of the area being overlap, and are disposed on both bottom panel 510 and the other one of panels 520, e.g., with about 20–70% of the area on one panel. In addition, the loop of antenna 554 is disposed on panel 510 and overlaps each of loop antenna 550, 552, e.g., by about 10–35%.

In one example antenna arrangement 500 suitable for detecting wireless tags associated with baggage, as might be utilized in an airport or rail station, arrangement 500 is 79 inches long, 43 inches wide and 29 inches high (about 2.0 by 1.1 by 0.74 meters). The structure of panels 510, 520 is provided by a "U-shaped" frame of tubular members (e.g., plastic pipe covered with a plastic netting to which antenna 520–552 are fastened) Each of loop antenna 530, 532, 550, 552 is generally elliptical in shape and has a minor diameter of about 22 inches (about 0.56 meter) and a major diameter of about 40 inches (about 1.02 meters) of which about 29 inches (about 0.74 meter) is on a panel 520 and about 11 inches (about 0.28 meter) is on panel 510. Of the 22 inch minor diameter (about 0.56 meter), about 8 inches (about 0.2 meter) overlaps the nearest like loop antenna. The exact percentage of overlap may vary depending upon the shape and mutual coupling of the loop antenna to produce a near-field effect of mutual non-canceling fields in all three mutually orthogonal directions.

The loop antenna 530–554 of antenna arrangement 500 may operate in parallel (i.e. simultaneously) via connections provided by coaxial cables and coaxial connectors, e.g., Tee connectors and cable connectors of the BNC type. Appropriate tuning, isolation and decoupling is provided by tuning and matching circuits 540, and by selecting an appropriate length for the interconnecting coaxial cable, e.g., about 14 inches (about 0.36 meter) between overlapping antenna 530–532 and 550–552. Typically, each antenna 530–554 is first tuned with its associated matching-filtering network 540, e.g., by adjusting variable tuning capacitors thereof. After the antenna 530–554 are connected by 50-ohm coaxial cables 542, 544 and BNC Tee connectors, they are re-tuned and matched for satisfactory read-write distances in each of the x, y and z directions for the respective panels 510, 520. Interactions between the fields produced by each loop antenna 530–554 necessitates such adjustment using the variable tuning capacitors included in each of tuning/matching circuits 540.

Alternatively, antenna 530–554 may be switched and/or sequenced in time, although simultaneous operation is presently thought to be preferable.

Thus, loop antenna 530–554 cooperate to establish electromagnetic fields within detection region 504 of sufficient field strength to communicate with wireless tags at a predetermined frequency, e.g., with substantially 100% reading accuracy independent of the orientation and position of the tag within passage 504.

One preferred example wireless tag useful with antenna 500 in a baggage tracking application operates at about 13.56 MHZ and has a spiral antenna about two inches by three inches in size. Tuning circuits 540 couple and tune antennas 530–554 to communicate with a wireless article reader/writer that operates at about 13.56 MHZ, typically at an average power level of about 4 watts or less, however, greater power may be utilized for larger antenna arrangements. Wireless tags, readers/writers and antenna that operate and communicate at other frequencies may also be utilized.

Figure 12A:
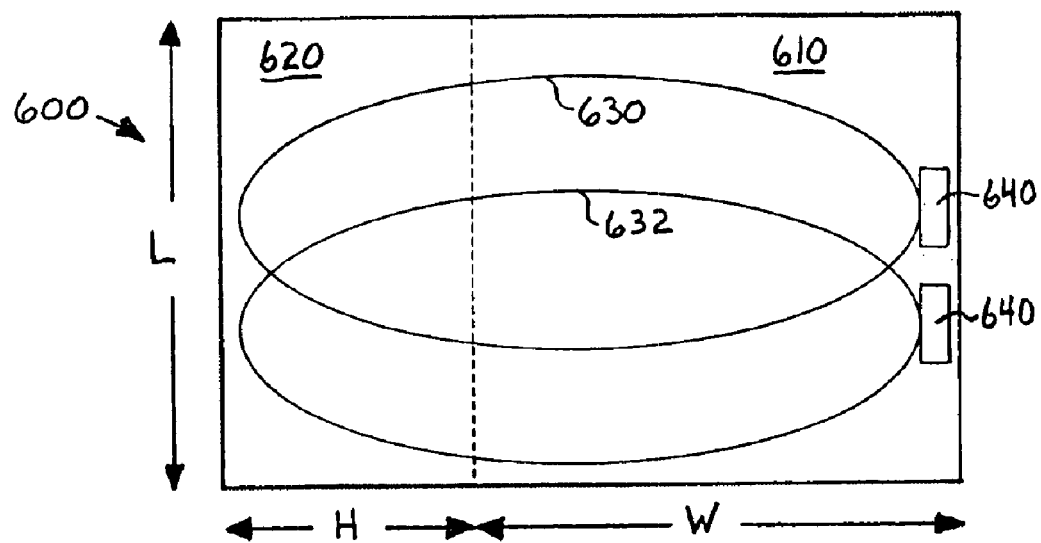
FIGS. 12A and 12B are an unfolded view and an isometric view, respectively, of an example open antenna array arrangement.
Figure 12B:
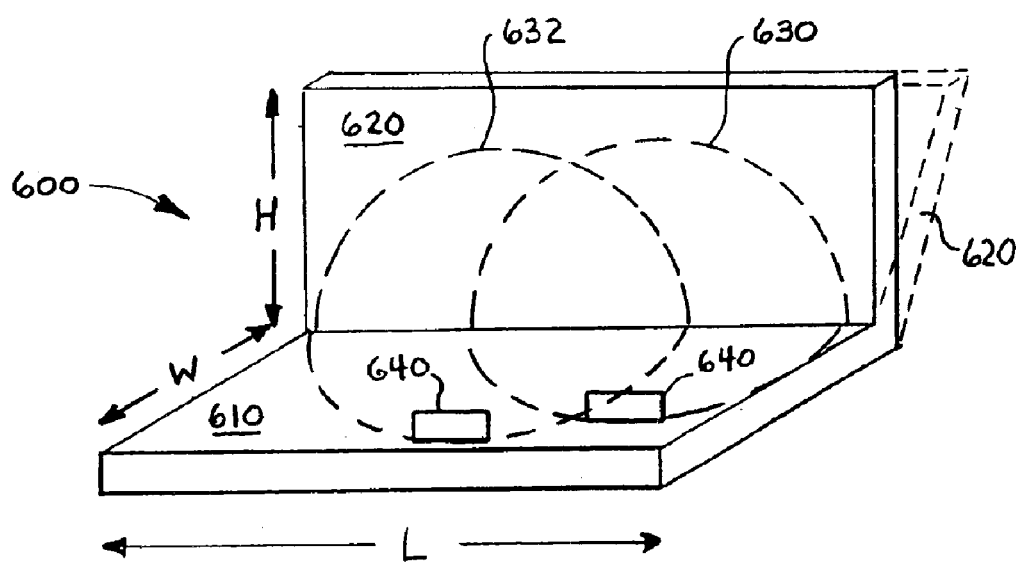

FIGS. 12A and 12B are an unfolded view and an isometric view, respectively, of an open antenna array arrangement 600. Open antenna arrangement 600 includes two panels, e.g., a bottom or base panel 610 and a vertical or side panel 620 wherein the side panel 620 is typically positioned perpendicular to base panel 610, but may be at a greater or lesser angle, if convenient or desired. For example, the angle at which the two panels are disposed may be between about 80° and about 100°. FIG. 12A is an "unfolded" view in that panel 620 is illustrated in a plane with base panel 610, rather than perpendicular thereto as in the position in which they are utilized. The designations "bottom" and "base," and "vertical" and "side," are examples in that antenna arrangement 600 may be utilized in any desired orientation.

Panels or planes 610, 620 define an open passage or detection region 604 therebetween through which articles may pass or in which articles and/or objects may be placed for detecting wireless tags (smart RFID tags) thereon, as described above. An open passage or region is convenient and may be desirable because it facilitates its installation, e.g., in locations with pre-existing conveyors, allows for detection of an article having a size greater than the size of the detection region and makes manual placement and retrieval of any article therein easier and convenient.

For example, while antenna arrangement 600 may be installed in or removed from an operation position in relation to a conveyor as described above, it is thought to be suited for use where a person or machine places articles having wireless tags into the detection region 604 thereof. Typically, antenna arrangement 600 is placed on a counter, table or other horizontal surface with panel 610 at bottom and with side panel 620 extending upwardly. Alternatively, antenna arrangement 600 may be mounted to a wall, cabinet or other vertical surface with base panel 610 extending therefrom. For an example in dispensing of relatively small objects, such as may be utilized at a pharmacy or hospital for dispensing medication and/or medical devices, arrangement 600 may have a length L of about 38 inches (about 0.97 meter), a width W of about 10–30 inches (about 0.25–0.76 meter) and a height H of about 26 inches (about 0.13–0.38 meter), although other dimensions may be utilized for other applications of arrangement 600.

Example antenna arrangement 600 includes two loop antenna 630, 632, each of which is coupled by a tuning circuit, matching network and/or filter 640 (e.g., similar to tuning network or filter 36 described above) via coaxial cables 642, 644 to a wireless article reader/decoder (e.g., similar to reader/decoder 50, 150, 160 described above). The loops of antenna 630 and 632 extend to proximate the edges of panels 610, 620 and are partially overlapping, e.g., with about 10–40% of the area being overlap, and are disposed on both panel 610 and panel 620, e.g., with about 20–70% on one panel.

The loop antenna 630–632 of antenna arrangement 600 may operate in parallel with appropriate isolation and decoupling provided by tuning circuits 640, i.e. simultaneously as above, and/or may be switched and/or sequenced in time. Thus, loop antenna 630–632 cooperate to establish electromagnetic fields within detection region 604 of sufficient field strength to communicate with wireless tags (RFID tags) at a predetermined frequency, e.g., with substantially 100% reading accuracy independent of the orientation and position of the tag within detection region 604.

One preferred example wireless tag useful with antenna 600 operates at about 13.56 MHZ and has a spiral antenna about two inches by three inches in size. Another preferred example wireless tag useful with antenna 600 in dispensing medication in relatively small containers operates at about 13.56 MHZ and has a spiral antenna about 0.5 inches by 0.6 inches in size. Tuning circuits 640 couple and tune antennas 630–632 to communicate via 50-ohm coaxial cables 642, 644 with a wireless article reader/writer that operates at about 13.56 MHZ, typically at an average power level of about 4 watts or less.

The described arrangement is suitable for wireless tags and readers/decoders operating at frequencies near 13.56 MHZ for producing a suitable near-field effect for reading information from the wireless tag and for transmitting signals information thereto. Antenna arrangement 600 may be small, e.g., about 4 by 4 by 4 inches (about 0.10 by 0.10 by 0.10 meter) or less, depending upon the strength of the fields produced at the operating frequency, e.g., 13.56 MHZ. Wireless tags, readers/writers and antenna that operate and communicate at other frequencies may also be utilized.

It is noted that antenna 500 and/or antenna 600 may be fabricated and/or shipped "flat" and then be "folded" into the trough or "L" shape configuration at a test and/or use location or may be fabricated and/or transported in the trough or "L" shape configuration. The coaxial cable of which antenna 500, 600 are preferably made may be formed and attached to a structure and/or frame defining the trough and/or "L" shape either as part of fabrication of antenna 500, 600 or at a test and/or use location.

Loop antenna arrangement 500 (and/or 600) may include a light or infrared source and detector pair 560a, 560b for detecting objects passing through the detection region 504 thereof. The light and/or IR beam between source/detector pair 560a, 560b will be broken or interrupted by an object passing therethrough to provide an independent signal that may be correlated with detection of a wireless article and/or RFID tag associated with the object passing therethrough, and so may be utilized for providing an independent check or confirmation that the object is tagged and that the wireless tag has been detected via antenna 500. Such check or confirmation may be utilized in testing and/or evaluating antenna arrangement 500, and/or in operating antenna arrangement 500. Pair 560a, 560b could be connected to a counter and/or to an alarm, e.g., as for detecting untagged or improperly tagged baggage that may pose a security and/or accounting issue to be investigated and/or resolved, and/or to alert an appropriate person of such situation or possible non-detection.

Figure 13A:
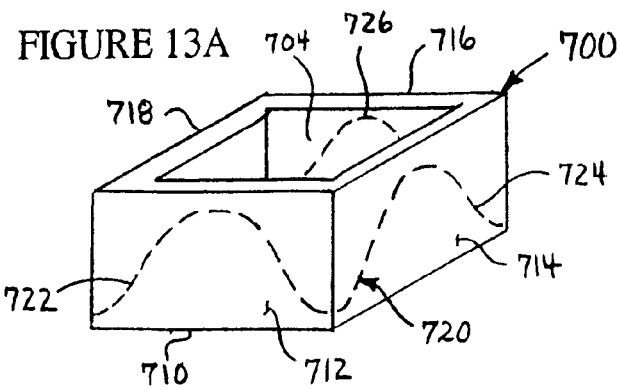
FIGS. 13A and 13B are isometric views of example embodiments of an open antenna arrangement and FIG. 13C is a view of the bottom of the example antenna arrangement of FIG. 13A.
Figure 13B:
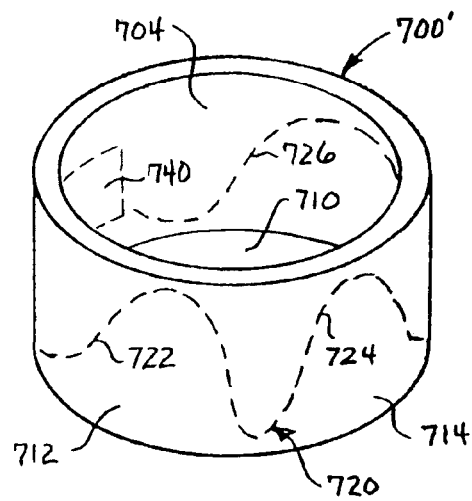
Figure 13C:
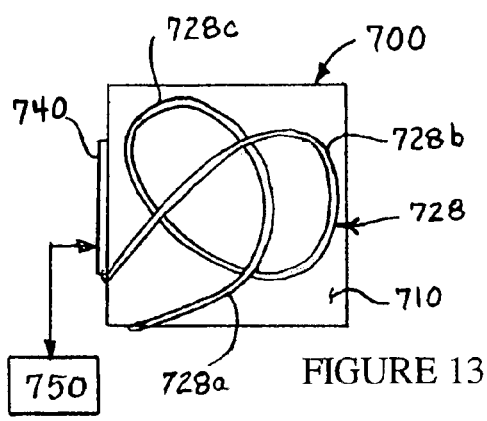

FIGS. 13A and 13B are isometric views of example embodiments of open antenna arrangement 700, 700' and FIG. 13C is a view of the bottom of the example antenna arrangement 700 of FIG. 13A. Example antenna 700 is of generally rectangular shape and has four sides or walls 712, 714, 716, 718 extending from a bottom or base 710, thereby to define a generally rectangular opening or detection region 704 into which an object including an RFID tag or wireless tag may be placed to be identified and/or detected by electromagnetic fields coupled via loop antenna 720.

Example antenna arrangement 700' of FIG. 13B is like antenna arrangement 700 except that its wall(s) 712–718 define a generally circular or elliptical or oval shape. In fact, wall(s) 712–718 may be arranged to define any desired shape of container. Antenna arrangements 700, 700' may be particularly useful with medication containers, medical devices, and the like, that are tagged or associated with a wireless identification tag, e.g., in a hospital, pharmacy and/or home or use environment.

Loop antenna 720 is disposed in a meandering or serpentine fashion on sides 712, 714, 716, 718 and base 710 generally as illustrated. Specifically, loop antenna 720 has a fixed wavy or undulating shape, e.g., defines a generally wavy or sinusoidal-like shape 722, 724, 726 on each of sides 712, 714 716, respectively, being proximate base 710 near the intersections of sides 712, 714, 716, 718 and distal base 710 at an intermediate region of each of sides 712, 714, 716. Loop antenna 720 is disposed in a "pretzel-like" shape 728 on base 710 wherein loops 728a, 728b, 728c are defined by the cable of loop 728 of antenna 720 crossing over itself, e.g., three times. Loop antenna 720 couples to tuning circuit 740 disposed, for example, on side 718, which couples to an RFID tag reader and/or writer, and/or a processor, computer and/or utilization device or system 750, e.g., as described herein.

Thus, loop antenna 720 has at least two (preferably three) fixed undulating loop portions 722, 724, 726 on the side(s) or wall(s) 712, 714, 716 of container 700, 700' and has at least two (preferably three) loop portions 728 on the bottom or base thereof, thereby defining a detection region 704. Loop antenna 720 is preferably formed of a coaxial cable, e.g., a type RG 174/U coaxial cable, disposed in the pattern described and illustrated, and is preferably enclosed within the wall(s) and base of a container 700, 700'. While the wall(s) 712–718 are illustrated as being generally perpendicular to base 710, they may be at an angle with respect thereto, e.g., between 80° and 100°, typically outwardly so that the opening to detection volume 704 is larger than is base 710.

Figure 14:
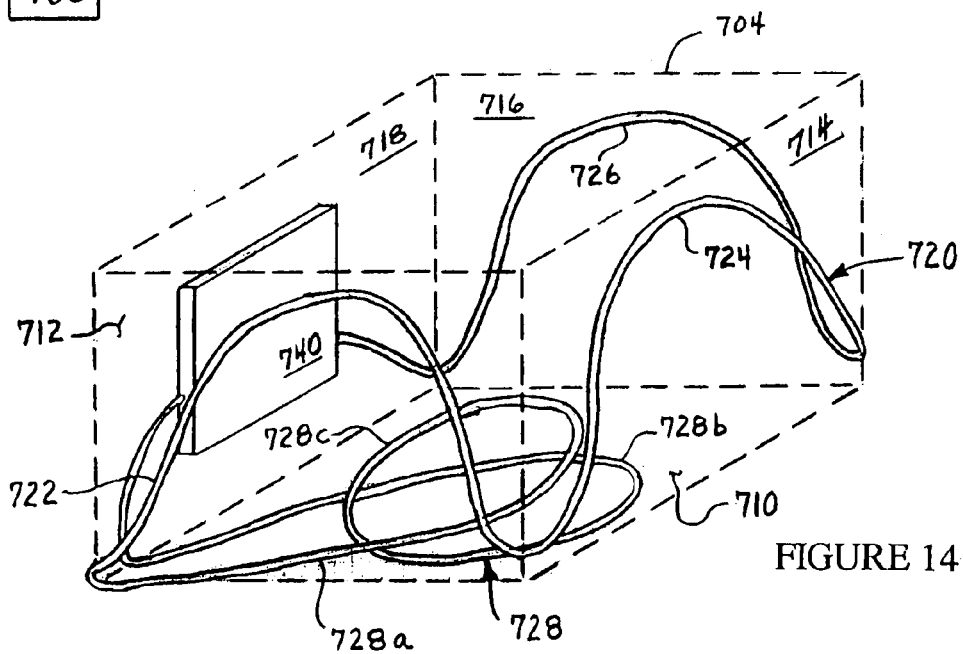
FIG. 14 is an isometric diagram illustrating the arrangement of the antenna of the example antenna arrangement of FIGS. 13A and 13C.

FIG. 14 is an isometric diagram illustrating the arrangement of the antenna 700 of the example antenna arrangement of FIGS. 13A and 13C. The wall(s)/side(s) 712–718 and base/bottom 710 are illustrated as transparent so that the arrangement of loop antenna 720 is visible. The coaxial cable of antenna 720 includes three undulations 722, 724, 726 and a three loop portion 728a, 728b, 728c all in series and coupled to tuning circuit 740, thereby to define a detection region 704 approximating the volume defined by base and walls 710–718 shown in phantom.

Container 700, 700' including an antenna 720 comprises a container 700, 700' having a base 710 and a wall 712–718 extending from the base 710 to define a volume 704. Loop antenna 720 has a portion 728 disposed on the container base 710 and crossing over itself at least twice on the container base 710, and a wavy portion 722, 724, 726 disposed on the container wall 712, 714, 716, 718 and defining at least two waves 722, 724, 726 on the container wall 712, 714, 716, 718. A means 740 couples the loop antenna 720 to an external processor 750. The container wall 712, 714, 716, 718 defines one of a circular, oval, elliptical, rectangular and square shape. The coupling means 740 may include at least one of a tuning circuit, a filter and a switch for selectively connecting the loop antenna to the external processor, as described.

With regard to each of the antennas 530–554, 630–632, 720, of FIGS. 11A–11B, 12A–12B, 13A–13C and 14, the arrangement of the matching network and/or tuning circuit 540, 640, 740, is as described above in relation to FIG. 6, it being understood that the values of the various components thereof are selected for the particular antenna and its frequency of operation. Other tuning circuits and/or matching networks may be utilized as is known to those of skill in the art.

While the antenna arrangements described herein may be utilized with many sizes, varieties and types of wireless tags or RFID tags and/or labels and/or cards, suitable wireless tags are described, for example, in pending U.S. patent application Ser. No. 10/191,580 entitled "ELECTRONIC CIRCUIT CONSTRUCTION, AS FOR A WIRELESS RF TAG" filed by Kevin Kwong-Tai Chung and William Lewis Sked on Jul. 9, 2002, now U.S. Pat. No. 6,665,193, which is hereby incorporated herein by reference in its entirety.

While the present invention has been described in terms of the foregoing example embodiments, variations within the scope and spirit of the present invention as defined by the claims following will be apparent to those skilled in the art. For example, while the antennas and portals described herein are generally rectangular, the antennas and portals may be of any desired shape, whether regular or irregular, as may be necessary and/or convenient in a particular application or utilization location. In general, dimensions, shapes and other quantities are not and need not be exact, but may be approximate and/or larger or smaller, as desired, reflecting tolerances, conversion factors, rounding off, measurement error and the like, whether or not stated to be "about," and "about" includes at least the foregoing.

Antennas and antenna arrays and arrangements described herein may be employed with utilization systems for any one or more of toll collection, object identification, stolen object identification, theft prevention, object tracking, retailing, package tracking, baggage tracking, medication and/or medical device dispensing and/or usage, inventory tracking, factory and/or warehouse inventory, security identification, and/or access control. Further, the tag information may simply be displayed on a display device to identify the object tagged, as might be desired in connection with a passenger baggage system or a personnel identification system.

The detection region may include any one or more of a portal, a passage, a passageway, a doorway, an access, an egress, a trough, a security gate, a toll gate, an electronic gate, a retail check-out station, a corridor, a tunnel, a conveyor, a baggage cart, an enclosure, a storage space, a container, a shipping container, a pallet, a cargo bay, a truck, a trailer, a loading area, a warehouse, and any other suitable arrangement.

Further, for a typical smart-card-size tag available from Avante International Technology employing the Philips I-CODE electronic chip and a Philips compatible reader/writer with its power increased from about 5 watts to about 30 watts, tags may be read at distances of about 1–2 meters which is suitable for vehicle toll collection where the flexible tag is placed near a side edge of the vehicle windshield glass. Where fixed reader antennae are placed at both sides of the vehicle portal or gate, the gate width can be increased up to more than about 4 meters. Were such tags to be routinely placed in vehicles or other objects, e.g., at manufacture or sale or in a registration or inspection decal, such antennae portals or gates can be coupled to a system containing the identifiers of stolen vehicles and objects for identifying stolen vehicles or objects when they pass through such portals or gates.

It is noted that the objects to be detected need not pass through the portal or passageway or be in the enclosure one-by-one, but may pass by or enter in groups, such as groups of people having identification badges passing an access or egress control location or a pallet or box of objects, whether carried by hand or mechanically, such as by a fork-lift or truck, and/or they may remain in the portal or passageway or enclosure for a period of time.

What is claimed is:

1. An antenna arrangement for detecting a wireless article comprising:
   a first antenna loop disposed in a first plane for transmitting and/or receiving electromagnetic signals;
   a first tunable circuit connected to said first antenna loop for coupling at least received signals therefrom;
   a second antenna loop disposed at least in part in the first plane and overlapping at least in part said first antenna loop therein,
   wherein said first and second antenna loops overlap at least in part in the first plane and define a detection region adjacent thereto in which said first and second antenna loops transmit and/or receive electromagnetic signals and in which a wireless article may be;
   a second tunable circuit connected to said second antenna loop for coupling at least received signals therefrom; and
   a processor coupled to said first and second tunable circuits for processing at least received signals from said first and second antenna loops for detecting a wireless article in detection region.

2. The antenna arrangement of claim 1 wherein at least part of said second antenna loop is in a second plane and the angle at which the first and second intersecting planes intersect is between about 80° and about 100°.

3. The antenna arrangement of claim 1 wherein said first and second tunable circuits each includes at least one of a tuning circuit and a filter for selectively connecting said first and second antenna loops and said processor.

4. The antenna arrangement of claim 1 in combination with a wireless article including a loop antenna and an electronic device including a memory, wherein said processor processes received signals of a type produced by the electronic device and transmitted via the wireless article loop antenna.

5. The antenna arrangement of claim 1 wherein said processor processes transmitted signals and the received signals, wherein the transmitted signals are coupled by said first and second tunable circuits to said first and second antenna loops to be transmitted thereby.

6. The antenna arrangement of claim 5 in combination with a wireless article including a loop antenna and an electronic device including a memory, wherein said processor processes transmitted signals of a type received by the electronic device via the wireless article loop antenna and processes received signals of a type produced by the electronic device and transmitted via the wireless article loop antenna.

7. The antenna arrangement of claim 6 wherein the signals received by the electronic device activate, operate, and/or control the electronic device and cause storing of information in the memory and/or reading of information from the memory.

8. The antenna arrangement of claim 1 in combination with a utilization system operable in conjunction with transmitted signals and the received signals for toll collection, object identification, stolen object identification, theft prevention, object tracking, package tracking, baggage tracking, medication dispensing and/or usage, medical device dispensing and/or usage, retailing, inventory tracking, factory and/or warehouse inventory, security identification, and/or access control.

9. The antenna arrangement of claim 1 wherein the detection region includes a portal, a passage, a passageway, a doorway, an access, an egress, a security gate, a toll gate, an electronic gate, a retail check-out station, a hospital, a medical facility, a pharmacy, a location at which medication and/or a medical device is dispensed and/or used, a corridor, a tunnel, a conveyor, a trough, a baggage cart, an enclosure, a storage space, a container, a shipping container, a pallet, a cargo bay, a truck, a trailer, a loading area, and/or a warehouse.

10. An antenna arrangement for detecting a wireless article in a detection region comprising:
    a first antenna loop disposed in a first plane for transmitting and/or receiving electromagnetic signals;
    a first tunable circuit connected to said first antenna loop for coupling at least received signals therefrom;
    a second antenna loop disposed at least in part in the first plane and overlapping at least in part said first antenna loop therein,
    wherein said first and second antenna loops overlap at least in part in the first plane and define a detection region adjacent thereto in which said first and second antenna loops transmit and/or receive electromagnetic signals and in which a wireless article may be;
    a second tunable circuit connected to said second antenna loop for coupling at least received signals therefrom; and
    electrical conductors connected to said first and second tunable circuits for coupling at least received signals from said first and second antenna loops for detecting a wireless article in the detection region.

11. The antenna arrangement of claim 10 wherein at least part of said second antenna loop is in a second plane and the angle at which the first and second intersecting planes intersect is between about 80° and about 100°.

12. The antenna arrangement of claim 10 wherein said first and second tunable circuits each includes at least one of a tuning circuit and a filter for selectively connecting said first and second antenna loops and said electrical conductors.

13. The antenna arrangement of claim 10 in combination with a wireless article including a loop antenna and an electronic device including a memory, wherein said first and second antenna loops receive signals of a type produced by the electronic device and transmitted via the wireless article loop antenna.

14. The antenna arrangement of claim 10 in combination with a wireless article including a loop antenna and an electronic device including a memory, wherein said first and second antenna loops transmit signals of a type received by the electronic device via the wireless article loop antenna and receive signals of a type produced by the electronic device and transmitted via the wireless article loop antenna.

15. The antenna arrangement of claim 14 wherein the signals received by the electronic device activate, operate, and/or control the electronic device and cause storing of information in the memory and/or reading of information from the memory.

16. The antenna arrangement of claim 10 in combination with a utilization system operable in conjunction with transmitted signals and the received signals for toll collection, object identification, stolen object identification, theft prevention, object tracking, package tracking, baggage tracking, medication dispensing and/or usage, medical device dispensing and/or usage, retailing, inventory tracking, factory and/or warehouse inventory, security identification, and/or access control.

17. The antenna arrangement of claim 10 wherein the detection region includes a portal, a passage, a passageway, a doorway, an access, an egress, a security gate, a toll gate, an electronic gate, a retail check-out station, a hospital, a medical facility, a pharmacy, a location at which medication and/or a medical device is dispensed and/or used, a corridor, a tunnel, a conveyor, a trough, a baggage cart, an enclosure, a storage space, a container, a shipping container, a pallet, a cargo bay, a truck, a trailer, a loading area, and/or a warehouse.

18. A method for detecting a wireless article in a detection region comprising:
   providing at least first and second loop antennas;
   disposing the first loop antenna in a first plane and disposing the second loop antenna at least in part in the first plane, wherein said first and second loop antennas overlap at least in part in the first plane, thereby to define a detection region adjacent thereto in which a wireless article may be;
   causing the at least first and second loop antennas to transmit and/or receive electromagnetic signals for signaling with a wireless article in the detection region;
   coupling the at least first and second loop antenna and a processor via first and second tunable circuits for receiving signals from the wireless article and/or for transmitting signals to the wireless article; and
   processing in the processor the received and/or transmitted signals for detecting a wireless article in the detection region.

19. The method of claim 18 wherein said coupling includes tuning, filtering and/or selectively connecting the first and second loop antennas.

20. The method of claim 19 wherein said selectively connecting includes one of sequentially connecting ones of the plurality of antenna loops and the processor and alternatingly connecting ones of the plurality of antenna loops and the processor.

21. The method of claim 18 further comprising:
   providing at least one wireless article including a loop antenna and an electronic device including a memory, wherein said processing includes processing transmitted signals of a type received by the electronic device via the loop antenna of the wireless article and processing received signals of a type produced by the electronic device and transmitted via the wireless article loop antenna.

22. The method of claim 18 wherein said processing comprises coupling signals related to the transmitted and/or received signals for performing toll collection, object identification, stolen object identification, theft prevention, object tracking, package tracking, baggage tracking, medication dispensing and/or usage, medical device dispensing and/or usage, retailing, inventory tracking, factory and/or warehouse inventory, security identification, and/or access control.

23. The method of claim 18 wherein the detection region includes a portal, a passage, a passageway, a doorway, an access, an egress, a security gate, a toll gate, an electronic gate, a retail check-out station, a hospital, a medical facility, a pharmacy, a location at which medication and/or a medical device is dispensed and/or used, a corridor, a tunnel, a conveyor, a trough, a baggage cart, an enclosure, a storage space, a container, a shipping container, a pallet, a cargo bay, a truck, a trailer, a loading area, and/or warehouse.

24. An antenna arrangement for detecting a wireless article in a detection region comprising:
   a loop antenna formed of a loop conductor, wherein the loop conductor of said loop antenna is disposed in a plane and crosses over itself at least at three locations in the plane, thereby to define a pretzel-like shape in the plane,
   wherein said loop antenna defines a detection region adjacent the plane in which detection region said loop antenna transmits and/or receives electromagnetic signals with a component of an associated electromagnetic field in each of three mutually orthogonal directions and in which a wireless article may be;
   a processor for providing signals to be transmitted by said loop antenna and for processing signals received from said loop antenna for detecting a wireless article in the detection region; and
   a tunable filter circuit for coupling said loop antenna and said processor, whereby signals provided by said processor are transmitted by said loop antenna and signals received by said loop antenna are coupled to said processor for detecting a wireless article in the detection region.

25. A method for detecting a wireless article in a detection region of a loop antenna comprising:
   providing a loop antenna formed of a loop conductor disposed in a plane and crossing over itself at least twice in the plane,
   wherein the loop antenna defines a detection region adjacent the plane in which detection region said loop antenna transmits and/or receives electromagnetic signals with a component of an associated electromagnetic field in each of three mutually orthogonal directions and in which a wireless article may be;
   causing the loop antenna to transmit and/or receive electromagnetic signals having a component of an associated electromagnetic field in each of three mutually orthogonal directions for signaling with a wireless article in the detection region;
   providing a processor;
   coupling the loop antenna and the processor for receiving signals from the wireless article and/or for transmitting signals to the wireless article; and
   processing the received and/or transmitted signals for detecting a wireless article in the detection region.

* * * * *